United States Patent [19]
Neal et al.

[11] 3,873,963
[45] Mar. 25, 1975

[54] EMERGENCY VEHICLE WARNING SYSTEM

[76] Inventors: Joe L. Neal, 3836 Englewood Cir., Odessa, Tex. 79761; John Stephen Roberson, 5504 Salem Hill Dr., Austin, Tex. 78745

[22] Filed: Jan. 5, 1973

[21] Appl. No.: 321,381

[52] U.S. Cl. ................................................. 340/34
[51] Int. Cl. ............................................. G08g 1/00
[58] Field of Search ......... 340/32, 33, 34; 179/1 VE

[56] References Cited
UNITED STATES PATENTS

| | | | |
|---|---|---|---|
| 2,545,218 | 3/1951 | Weber et al. | 340/34 |
| 3,014,199 | 12/1961 | Dill et al. | 340/34 |
| 3,158,835 | 11/1964 | Hipkins | 340/34 |
| 3,182,288 | 5/1965 | Smith | 340/34 |
| 3,412,378 | 11/1968 | Thomas | 340/34 |
| 3,430,195 | 2/1969 | Castlen | 340/34 |
| 3,568,144 | 3/1971 | Streb | 340/34 |
| 3,626,365 | 12/1971 | Press et al. | 340/34 |
| 3,735,342 | 5/1973 | Helliker et al. | 340/34 |

*Primary Examiner*—Kathleen H. Claffy
*Assistant Examiner*—Randall P. Myers
*Attorney, Agent, or Firm*—Marcus L. Bates

[57] ABSTRACT

An alarm system for alerting persons in a first vehicle of the presence of an emergency vehicle in the vicinity of the first vehicle.

A microphone mounted externally of the first vehicle is connected to an amplifier which in turn has the output thereof connected to a resonant reed relay assembly. The relay switch is connected to the base circuit of a transistor while the operating coil of a relay having normally open contacts is series connected to the transistor. The resonant reed relay is designed to pass a predetermined narrow frequency range in the audio range, and to filter all others out. Since a siren emits frequencies from 60 to about 20 K hertz, the sound waves therefrom causes the resonant reed relay to conduct, which causes the transistor in the circuit to conduct, whereupon the relay coil is energized, causing the normally open contacts thereof to be moved to the closed position, thereby giving warning to persons in the first vehicle of the presence of an emergency vehicle.

A time delay circuit limits the operating period of the transistor circuit after the last signal has been received so that when the emergency vehicle is no longer in the vicinity of the first vehicle, the apparatus automatically assumes the standby configuration.

1 Claim, 5 Drawing Figures

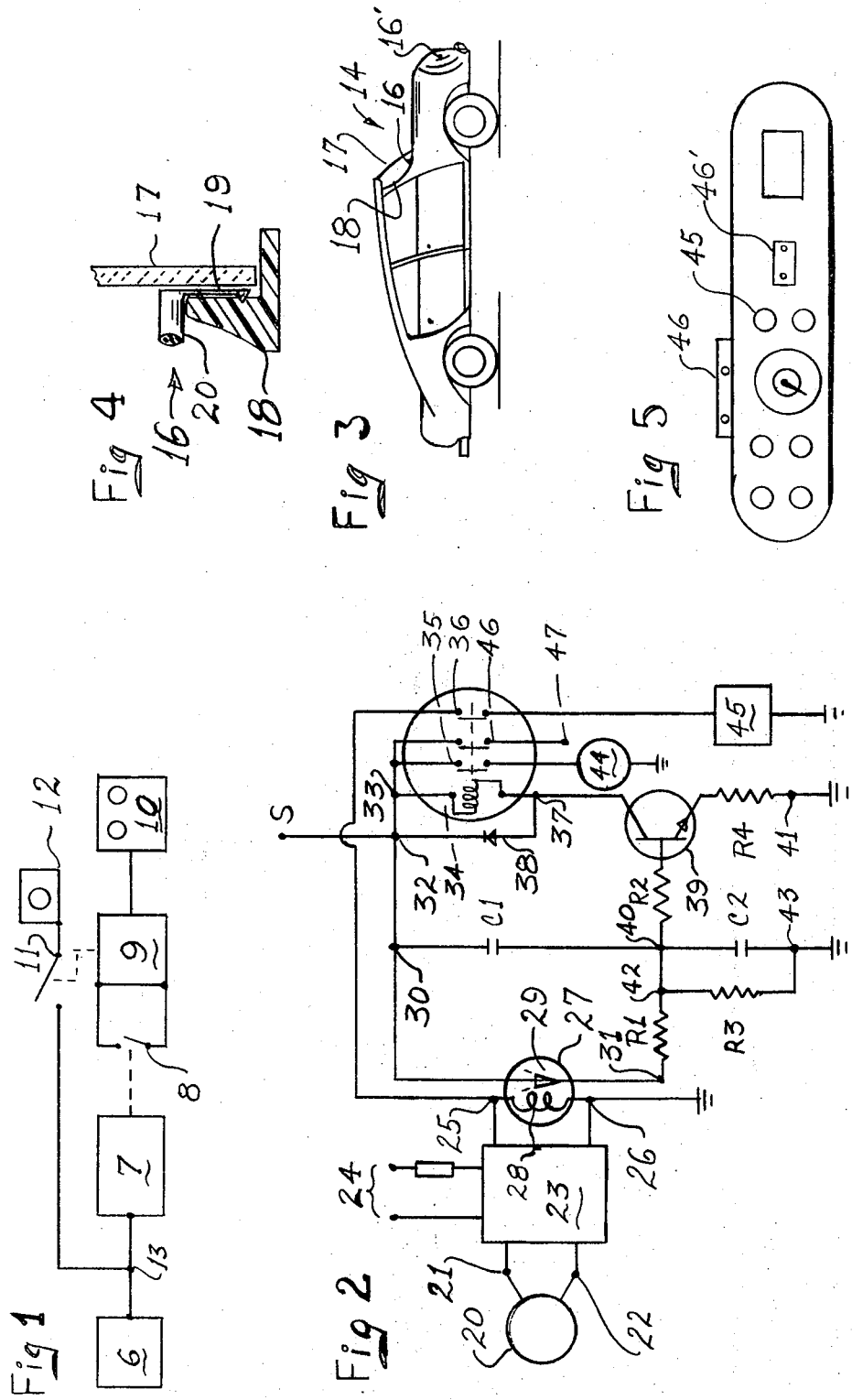

EMERGENCY VEHICLE WARNING SYSTEM

BACKGROUND OF THE INVENTION

Emergency vehicles such as ambulances, police cars, and fire trucks frequently collide with other vehicles such as passenger cars. The incidents of the collisions between emergency and passenger vehicles have increased over the years because of the increased congestion of traffic and because of the change in the design and equipment of the modern vehicle, as for example the increased usage of air conditioners during the summer time. Moreover, the recent emphasis placed upon noise level has made auto manufacturers more conscious of a quiet riding automobile and consequently, at all times of the year, the family automobile usually is equivalent to a sound proof room.

The difficulty in being alerted by the siren of an emergency vehicle is further complicated by increased background noise of the radio, heater, and the air conditioner. Added to these difficulties may be the distraction of other persons playing or talking while riding in the vehicle.

Accordingly, while the siren once was an excellent means by which to alert others of the close proximity of an emergency vehicle, and while all people have been trained since childhood to recognize and respect the sound of a siren, this ancient and heretofore reliable system of warning has become antiquated and dangerous because of the above described changes in the modern passenger vehicle.

Inasmuch as the populous is trained to associate a siren with an emergency vehicle, it is desirable to be able to retain this inexpensive means of alerting a first vehicle of the presence of an emergency vehicle in the immediate vicinity. Therefore, it is desirable to provide apparatus by which persons in a first vehicle can be alerted of the presence of an emergency vehicle in their vicinity so that the former can divert to provide a clear path for the latter.

SUMMARY OF THE INVENTION

An alarm system for alerting persons of the presence of an emergency vehicle comprising a sound detection means for producing an amplified electrical signal in response to a narrow frequency range selected from a wide frequency range of sound waves such as may be emitted by a siren of an emergency vehicle.

A resonant reed relay having a reed tuned to the aforesaid predetermined narrow frequency range is electrically connected to the sound detection means so that a switch associated with the relay is actuated upon the detection means receiving the sound waves emitted by a siren.

Circuit means including an operating coil type relay having normally open contacts is connected to be actuated by the resonant relay so that the normally open contacts can be used to energize an alarm means, thereby alerting persons of the oncoming emergency vehicle. The alarm means provides both visual and audible signals, and can be connected to de-energize the automobile heater, radio, and air conditioner, if desired.

Accordingly, a primary object of the present invention is the provision of an electronic vehicle warning system so that persons in a first vehicle are alerted to the presence of an oncoming emergency vehicle.

Another object of the invention is to provide means by which a person in a closed automobile is made aware of the sounding of a siren in their immediate vicinity.

A further object of this invention is to provide an alarm means which is responsive to a selected frequency range of sound.

A still further object of this invention is to provide an emergency vehicle warning system which is actuated by an emergency vehicle siren and which is automatically turned off after a predetermined time interval, unless the system is again actuated.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a diagrammatical representation in the form of a flow sheet which sets forth the essence of the present invention;

FIG. 2 is a schematical representation of circuitry which can be employed in carrying out the invention set forth in FIG. 1;

FIG. 3 is a perspective view of a first vehicle having incorporated therein the invention set forth in the foregoing figures;

FIG. 4 is a fragmentary enlarged part cross-sectional representation of part of the apparatus disclosed in FIG. 3; and FIG. 5 is an enlarged fragmentary representation of the interior of the vehicle disclosed in FIG. 3.

DETAILED DESCRIPTION OF THE PREFERRED EMBODIMENTS

In FIG. 1 there is disclosed a sound detection means 6 having circuit means by which it is electrically connected into a resonant reed relay assembly 7. The resonant reed relay actuates a switch means 8 for energizing circuit means 9. The circuit means 9 includes a relay actuated switch for energizing a visual signal 10 as well as closing switch 11. Switch 11 electrically connects a speaker 12 to junction 13 so that the sound detector 6 can be monitored by the speaker.

As seen in FIG. 3, an automobile 14 is provided with a number of suitable locations for satisfactorily mounting a microphone externally thereof so that the microphone will detect sound waves in proximity thereof. Windshield 17 of the automobile is conventionally held into its frame by a resilient gasket 18. Between the gasket and the windshield, a mounting tab 19 is placed in the illustrated manner of FIG. 4 so as to firmly affix a microphone 20 to the vehicle in an easy and rapid manner.

Looking now to the details of FIG. 2, the microphone 20 is provided with the usual current conducting wires 21, 22, which are electrically connected to the diagrammatically illustrated audio amplifier 23. The amplifier can take on any number of prior art forms and preferably is an integrated circuit having a gain of approximately 20. The audio amplifier is provided with a source of current and the ground connection as indicated by the numeral at 24.

The audio amplifier output is connected to terminals 25 and 26 of a resonant reed relay 27, the details of which will be discussed more fully later on in this disclosure. The relay is available from Branco Controls Divisions, Ladex, Inc., model RF20 EIA, Code 161.

This particular resonant reed relay is provided with a coil 28 connected to the beforementioned terminals 25, 26; with the coil being associated with a reed switch 29 which resonates and conducts when a current having a frequency of 1,006.9 hertz flows therethrough.

The switch of the relay is connected to terminals 30, 32, and 33 with terminal 32 also being connected to the indicated source of current "S," which preferably is 12 volts. Junction 33 is connected to the coil 34, hereinafter identified as the "second coil" of the illustrated switch assembly, hereinafter identified as the "second relay," which preferably is a 5 K ohm relay identified as follows: GE catalogue number CR120–E02108. The second coil of the second relay actuates the normally open switches 35, 36. Junction 37 is connected to the remaining end of the second coil with diode 38 being interposed between junctions 37 and 32. Other normally open switches 46 may be included in the switch assembly, if deemed desirable.

Transistor 39 (2N 2712) has the collector thereof connected to junction 37, the emitter thereof connected to R4 (47 K ohms), and the gate thereof connected to R2 (470 ohms), with the remaing end of the resistor being electrically connected to junction 40.

Resistor R1 (470 ohms) is connected across junctions 31 and 42, while the parallel resistor and condenser arrangement R3 (10 K ohms) and C2 (4 MFD) are grounded at 43.

Numeral 44 indicates a warning light while numeral 45 indicates a speaker. Terminal 47 is connected to a solenoid actuated switch (not shown) for turning off the radio, heater blower motor, or the air conditioner.

OPERATION

In operation with the apparatus provided with a suitable source of current, the dynamic microphone picks up and amplifies all audible signals imposed thereupon. Should an emergency vehicle sound its siren in close proximity to the microphone, the sound will be amplified and imposed upon the coil 28 of the resonant relay.

A siren emits frequencies from 60 to 20 K hertz. When a frequency of 1,006.9 hertz is detected, the reed relay oscillates and conducts current so that junction 40 is properly biased to cause the transistor 39 in the circuit to conduct current, which in turn causes the second relay to be energized. This action closes the normally open contacts of the switch assembly. One of the contacts energizes a warning light circuit 44. A second of the contacts energizes a speaker circuit. One or more remaining normally open contacts, if desired, can be utilized to interrupt the current flow to the air conditioner, heater blower, and/or the radio in the automobile. It is furthermore possible to utilize additional switches for rolling the windows down in the automobile should such an expedient be deemed desirable.

Looking in greater detail now to the circuitry disclosed in FIG. 2, it will be noted that when the system is in the standby configuration, current cannot flow from junction 33 through the coil 34 and through the transistor because the proper voltage is not available at terminal 40 to cause the transistor to conduct. However, when the resonant reed relay conducts current, the current flow occurs from terminal 30 through R1, R2, and to the base of the transistor, thereby causing the transistor to conduct current, thereupon providing a current flow through the coil 34 which in turn moves the normally open switches thereof to the closed position.

The time delay circuitry is comprised of C1, C2, and R3. Capacitor C1 (100 MFD) is normally charged. When the resonant relay switch conducts, the capacitor C1 is discharged. During the time delay period, C1 is charging, and when it becomes fully charged, the transistor will become nonconductive, whereupon switch 29 effectively bridges terminals 30 and 31. The time delay interval is therefore best controlled by changing the value of condenser C1.

The purpose of the diode at 38 is to prevent extraneous current (induced spikes) which may be induced into the system from causing damage to the transistor 39.

Should an extraneous noise having a frequency of 1,006.9 hertz be detected by the microphone, the system of FIG. 2 will be actuated for about ten seconds, and shortly thereafter it will turn itself off, depending upon the value of C1. Since 1,006.9 hertz is a frequency which is seldom duplicated by normal background noise, this situation seldom occurs in actual practice. On the other hand, should a siren be detected by the microphone, the solenoid will remain energized so long as the sound is detected because each pulse of 1,006.9 hertz delivered by the siren will restart the time delay period.

After the siren ceases to actuate the resonant relay, and no additional pulse frequency of 1,006.9 hertz is present, the current flow through the transistor will cease and the switches 35, 36 and 46 will return to the normally open position. This action causes both the speaker and the red light to become inactive.

Hence, the present invention provides an alarm system for alerting persons in a first vehicle 14 of the presence of an emergency vehicle by the provision of sound detection means 6 or 20 for producing an amplified electrical signal 13 or 25. Circuit means 7 or 27 responsive to a narrow range of frequencies includes a switch means 8 or 29 which is actuated upon said sound detector receiving a sound having therein said narrow range of frequencies. An alarm means 10, 12 or 44, 45 is responsive to said switch means being closed.

I claim:

1. An alarm system responsive to a predetermined narrow frequency range of sound waves comprising:
   sound detection means which generates an electrical signal in response to said predetermined narrow frequency range of sound waves being received by said sound detection means;
   resonant reed relay means having a coil and a switch means, circuit means connecting said electrical signal to said coil; said switch means being moved into the conducting configuration in response to current from said electrical signal flowing through said coil;
   second relay means including a second coil which actuates a switch means;
   a time delay circuit means for causing said second relay means to become deactuated after a predetermined lapse of time unless said sound detection means receives sound waves having a frequency which includes said narrow range of frequencies;

said time delay circuit means including a source of current and a transistor connected to said second coil so that current flows from the source of current, through said second coil, and through said transistor when said transistor is in the current conducting configuration; means including circuitry by which the base of said transistor is energized by said resonant reed relay;

circuit means electrically connecting said second coil to said switch means of said resonant reed relay means so that, when said sound detection means receives a signal to provide said electrical signal, the last said switch means is actuated; and an alarm means connected to be actuated by the last said switch means.

* * * * *